US010445658B2

(12) United States Patent
Salas et al.

(10) Patent No.: US 10,445,658 B2
(45) Date of Patent: Oct. 15, 2019

(54) DOCKET SEARCH AND ANALYTICS ENGINE

(71) Applicant: Thomson Reuters Global Resources, Baar (CH)

(72) Inventors: Daniel F. Salas, New York, NY (US); Frank Schilder, St. Paul, MN (US); Thomas W. Vacek, Minneapolis, MN (US)

(73) Assignee: Thomson Reuters Global Resources Unlimited Company, Baar (CH)

( * ) Notice: Subject to any disclaimer, the term of this patent is extended or adjusted under 35 U.S.C. 154(b) by 658 days.

(21) Appl. No.: 15/173,061

(22) Filed: Jun. 3, 2016

(65) Prior Publication Data
US 2017/0076001 A1    Mar. 16, 2017

Related U.S. Application Data

(60) Provisional application No. 62/218,024, filed on Sep. 14, 2015.

(51) Int. Cl.
G06F 15/18 (2006.01)
G06N 20/00 (2019.01)
G06Q 50/18 (2012.01)
G06Q 10/10 (2012.01)

(52) U.S. Cl.
CPC ............ *G06N 20/00* (2019.01); *G06Q 10/10* (2013.01); *G06Q 50/18* (2013.01)

(58) Field of Classification Search
CPC ................................ G06F 17/21; G06N 5/022
USPC ...................................................... 706/15, 45
See application file for complete search history.

(56) References Cited

U.S. PATENT DOCUMENTS

| 7,519,553 B2 * | 4/2009 | Abe | G06Q 40/00 705/30 |
| 7,895,104 B1 * | 2/2011 | Lee | G06Q 10/0637 705/35 |
| 2014/0304505 A1 * | 10/2014 | Dawson | G06F 21/6227 713/165 |

* cited by examiner

*Primary Examiner* — David R Vincent
(74) *Attorney, Agent, or Firm* — Duncan Galloway Egan Greenwald, PLLC; Kevin T. Duncan

(57) ABSTRACT

The present invention provides an improved docket search and analytics engine for determining the outcome of a case for a particular entity or party, for predicting the outcome of a case for a particular entity or party, or for predicting the time to resolution of a case for a particular entity or party. More specifically, the present invention provides a system and engine for accessing and retrieving docket and other data from a plurality of databases and applying by one or more engines a set of models to the retrieved data to make a determination or prediction as to the outcome of a case for an entity or party involved in the case.

21 Claims, 9 Drawing Sheets

Dockets 500

| | |
|---|---|
| Court: | U.S. DISTRICT COURT, EASTERN DISTRICT OF PENNSYLVANIA (PHILADELPHIA) |
| Case Title: | WINEGAR v. AC AND S INC ET AL |
| Case: | 2:08-CV-91324 |
| Judge: | HONORABLE EDUARDO C. ROBRENO |
| Date Filed: | 11/17/2008 |
| Other Dockets: | IN-N, 01-60530 |
| Date Closed/Terminated: | 08/17/2010 — 502, 504 |
| Case Status: | CLOSED, ASBESTOS, IN-N, MDL-875 |

PARTICIPANT INFORMATION — 506

WILLIAM WINEGAR INDIVIDUALLY

AC AND S INC

AP GREEN INDUSTRIES INC

TRAVELERS PROPERTY CASUALTY COMPANY OF AMERICA — 510

| | |
|---|---|
| Type: | Counter Defendant — 512 |
| Party Terminated: | TERMINATED: 09/04/2007 — 514 |

CHICAGO FIREBRICK COMPANY

COMBUSTION ENGINEERING INC

CBR LTD

DANA CORP

FIGURE 5

DOCKET SEARCH AND ANALYTICS ENGINE

CROSS REFERENCE TO RELATED APPLICATION

The present application claims benefit of priority to U.S. Provisional Application 62/218,024, filed Sep. 14, 2015, entitled CASE OUTCOME, the contents of which are hereby incorporated by reference herein in the entirety.

FIELD OF THE INVENTION

The present invention relates generally to improvements in docket search and analytics engine to deliver robust legal case analytics and enhanced predictive outcomes based on legal docket systems. More particularly, the invention relates to a computer-implemented engine configured to detect and predict outcomes concerning a legal case based on occurrences or events that have occurred in the matter as accessed via a court docket.

BACKGROUND OF THE INVENTION

With the advents of computer-implemented data capturing and processing and mass data storage, the amount of information generated by mankind has risen dramatically and with an ever quickening pace. As a result there is a continuing and growing need to collect and store, identify, track, classify and to assimilate, transform and re-define this growing sea of information for heightened use by humans. As a result, there are many systems that aggregate information from a variety of sources and attempt to categorize and organize this information. Some of these systems even endeavor to predict the outcome of events based on algorithms, formulae, or pattern matching. These systems fail to accurately determine the outcome or predict the outcome of a legal case based on information gathered from a docketing system. A case or legal case is an action, cause, suit, or controversy at law or in equity, a question contested before a court of justice, or an aggregate of facts which furnishes occasion for the exercise of the jurisdiction of a court of justice. Black's Law Dictionary 215 (Joseph R. Nolan ed., 6th ed., West 1990).

In many areas and industries, including the financial and legal sectors and areas of technology, for example, there are content and enhanced experience providers, such as The Thomson Reuters Corporation. Such providers identify, collect, analyze and process key data for use in generating content for consumption by professionals and others involved in the respective industries. Providers in the various sectors and industries continually look for products and services to provide subscribers, clients and other customers and for ways to distinguish their firm's offerings over the competition. Such providers constantly strive to create and provide enhanced tools, including search tools, to enable clients to more efficiently and effectively process information and make informed decisions.

There are known services providing preprocessing of data, entity extraction, entity linking, indexing of data, and for indexing ontologies that may be used in delivery of peer identification services. For example U.S. Pat. No. 7,333,966, entitled "SYSTEMS, METHODS, AND SOFTWARE FOR HYPERLINKING NAMES", U.S. Pat. Pub. 2009/0198678, entitled "SYSTEMS, METHODS, AND SOFTWARE FOR ENTITY RELATIONSHIP RESOLUTION", U.S. patent application Ser. No. 12/553,013, entitled "SYSTEMS, METHODS, AND SOFTWARE FOR QUESTION-BASED SENTIMENT ANALYSIS AND SUMMARIZATION", U.S. Pat. Pub. 2009/0327115, entitled "FINANCIAL EVENT AND RELATIONSHIP EXTRACTION", and U.S. Pat. Pub. 2009/0222395, entitled "ENTITY, EVENT, AND RELATIONSHIP EXTRACTION", the contents of each of which are incorporated herein by reference herein in their entirety, describe systems, methods and software for the preprocessing of data, entity extraction, entity linking, indexing of data, and for indexing ontologies in addition to linguistic and other techniques for mining or extracting information from documents and sources. Systems and methods also exist for identifying and ranking documents including U.S. Pat. Publ. 2011/0191310 (Liao et al.) entitled "METHOD AND SYSTEM FOR RANKING INTELLECTUAL PROPERTY DOCUMENTS USING CLAIM ANALYSIS", which is incorporated by reference herein in its entirety. Additionally, systems and methods exist for identifying entity peers including U.S. patent application Ser. No. 14/926,591, (Olof-Ors et al.) entitled "DIGITAL COMMUNICATIONS INTERFACE AND GRAPHICAL USER INTERFACE", filed Oct. 29, 2015, which is hereby incorporated by reference in its entirety.

Existing technology may use a form of outcome detection technology, but is very much restricted to one practice area (e.g., IP) and requires considerable manual oversight. Current solutions provide probabilities or "predictions" solely based on the prior information (e.g. Judge John Smith settled in 3% of all prior cases). What is needed is an outcome detection and prediction engine that can determine or predict the outcome of a case as to a specific entity involved in the case.

SUMMARY OF THE INVENTION

The present invention provides a system and engine for determining the outcome of a case as to a specific party or entity or for predicting the outcome of a case for a specific party or entity based on existing entities or events in a docket. The invention can be used for various legal analytics use cases such as aggregating statistics over previous cases according to different dimensions (law firms, attorneys, parties) as well as predictive analytics for planning a litigation strategy. The generated analytics can also be used by the law firm's customers to get better insight into the law firm's performance based on previous cases or making predictions about the merits of a potential lawsuit.

The present invention may be used to generate analytics of all cases for which dockets exist and provide a more complete picture of the outcomes. The present invention also provides law firms and customers of law firms predictive analytics given only a limited number of dockets.

Given a docket document or database with a list or sequence of all docket entries from when the action was filed or opened until the case docket is closed, the present invention determines the actual outcome of a legal lawsuit based on a sequence tagging algorithm according to a hierarchy of possible outcomes (e.g. dismissed, settled, entry of judgment). The invention also determines the outcome for a respective party as soon as the party leaves the lawsuit (e.g., settled). In addition, the invention allows the prediction of the time to resolution based on an initial number of n docket entries by using a classification algorithm.

In a first embodiment the invention provides a computer-implemented system for detecting an outcome of a legal case, the system comprising: means for accessing, using a computing device having a processor and memory, data of docket entries, for each party the docket entries have reached a certain outcome for an existing docket; means for inputting, using the processor, the data into at least one machine sequence learning model to train a sequence tagging classifier; means for applying, using the processor, the sequence tagging classifier to a new docket with entries of each party to determine the outcome that is generated by each party; and means for outputting, using the processor, the determined outcome for at least one party.

In addition this first embodiment of the invention may be further characterized as follows: wherein the docket entries of the existing docket are annotated; and wherein the step of applying the sequence tagging classifier to a new docket with entries of each party comprises determining whether at least one party is terminated from the case and what the outcome is.

In a second embodiment the invention provides a computer-implemented method for detecting an outcome of a legal case, the method comprising: accessing data of docket entries, for each party the docket entries have reached a certain outcome for an existing docket; inputting the data into at least one machine sequence learning model to train a sequence tagging classifier; applying the sequence tagging classifier to a new docket with entries of each party to determine the outcome that is generated by each party; and outputting the determined outcome for at least one party.

In addition this second embodiment of the invention may be further characterized as follows: wherein the docket entries of the existing docket are annotated; and wherein the step of applying the sequence tagging classifier to a new docket with entries of each party comprises determining whether at least one party is terminated from the case and what the outcome is.

In a third embodiment the invention provides a computer-implemented system for detecting an outcome of a legal case, the system comprising: a computing device having a processor in electrical communication with a memory, the memory adapted to store data and instructions for executing by the processor; a data access module adapted to access from either the memory or a database having stored therein a first set of docket entry data, the first set of docket entry data including a set of docket entries for at least one existing docket and for each party for which the docket entries have reached a certain outcome; at least one machine sequence learning module adapted to receive the first set of docket entry data and, based on the received first set of docket entry data, train a sequence tagging classifier; executing by the processor the trained sequence tagging classifier against a second set of docket entry data, the second set of docket entry data being associated with a new docket other than the existing docket, the new docket having an associated set of parties, the trained sequence tagging classifier adapted to process docket entries from the second set of docket entry data associated with each party in the set of parties to determine an outcome attribute associated with at least one party from the set of parties; and an output adapted to transmit a signal related to the determined outcome attribute associated with the at least one party.

In a fourth embodiment the invention provides a computer-implemented system for predicting an expected resolution time of a legal case, the system comprising: means for accessing, using a computing device having a processor and memory, data of docket entries relating to an open docket; means for applying, using the processor, a regression calculation to the docket entries of each party; and means for outputting, using the processor, the expected resolution time.

In addition this fourth embodiment of the invention may be further characterized by: means for deriving N-grams from the docket entries and applying the derived N-grams to train the regression calculation; and means for creating training instances from a closed docket by holding out events after a randomly selected point-in-time. The expected resolution time is a number of days between an opening and closing date.

In a fifth embodiment the invention provides a computer-implemented method for predicting an expected resolution time of a legal case, the method comprising: accessing data of docket entries relating to an open docket; applying a regression calculation to the docket entries of each party; and outputting the expected resolution time.

In addition this fifth embodiment of the invention may be further characterized by: deriving N-grams from the docket entries and applying the derived N-grams to train the regression calculation; and creating training instances from a closed docket by holding out events after a randomly selected point-in-time.

In yet a sixth embodiment the invention provides a computer-implemented system for predicting an expected resolution time of a legal case, the system comprising: a computing device having a processor in electrical communication with a memory, the memory adapted to store data and instructions for executing by the processor; a data access module adapted to access from either the memory or a database having stored therein a first set of docket entry data, the first set of docket entry data including a set of docket entries for at least one open docket having an associated set of parties; a regression module when executed by the processor adapted to perform a regression calculation against docket entries associated with each party from the associated set of parties to determine an expected resolution time attribute associated with the open docket; and an output adapted to transmit a signal related to the determined expected resolution time attribute.

In a seventh embodiment the present invention provides a computer-implemented system for detecting an outcome of a legal case, the system comprising: a computing device having a processor in electrical communication with a memory, the memory adapted to store data and instructions for executing by the processor; a outcome detection engine operating on the computing device and comprising: a data access module adapted to access a first set of docket entry data stored in either the memory or a database, the first set of docket entry data including a set of docket entries and a corresponding set of identified dispositive outcomes in a legal case or an issue disposed of in a legal case; a sequence tagging classifier; and at least one machine sequence learning module adapted to receive the first set of docket entry data and, based on the received first set of docket entry data, train the sequence tagging classifier; wherein upon training the sequence tagging classifier is configured to be executed by the processor against a second set of docket entry data, the second set of docket entry data being associated with at least one subject docket other than the at least one existing docket, the second set of docket entry data having an associated set of parties, the trained sequence tagging classifier adapted to process docket entries from the second set of docket entry data associated with each party in the set of parties to determine a dispositive outcome attribute associated with at least one party from the set of parties; and an output adapted to transmit a signal related to the determined dispositive outcome attribute associated with the at least one party.

The system of the seventh embodiment may further comprise, wherein the at least one machine sequence learning module is adapted to train the sequence tagging classifier using at least one of a Hidden Markov Model (HMM) and a Conditional Random Field (CRF) model. The system may further comprise wherein the at least one machine sequence learning module receives and uses annotated data for training the at least one of a Hidden Markov Model (HMM) and a Conditional Random Field (CRF) model to detect a dispositive outcome associated with a docket entry. The system may further comprise wherein the machine sequence learning module is adapted to derive a set of features are derived from n-grams of text from the first set of docket entry data. The system may further comprise wherein the Outcome Detection Engine is adapted to determine a dispositive outcome attribute associated with at least one party from the set of parties. The system may further comprise wherein the trained sequence tagging classifier is adapted to process docket entries from the second set of docket entry data associated with each party in the set of parties using the "room model" to determine dispositive outcome attributes. The system may further comprise wherein the Outcome Detection Engine is adapted to rapidly process large amounts of docket data via an Apache SPARK implementation. The system may further comprise wherein the Outcome Detection Engine is further adapted to apply a conditional random field (CRF) to implement the sequence tagging classifier. The system may further comprise wherein the sequence tagging classifier comprises one or more of the following components: a masker, featurization, classification, and interparty inference. The system may further comprise wherein the first set of docket entry data includes a set of docket entries for each party for which the docket entries represent a dispositive outcome in a legal case or an issue disposed of in a legal case. The system may further comprise wherein the docket entries of the first set of docket entries are annotated. The system may further comprise wherein the sequence tagging classifier is further adapted to determine whether any party from the set of parties has been removed, terminated, withdrawn, or otherwise the subject of a dispositive action in the legal case or an issue resolved in the legal case and generate a signal representative of the nature of the dispositive outcome. The system may further comprise a docket resolution time detection module adapted to determine, based on data from the first set of docket entry data, time parameters representing the amount of time from a docket open data or a party.

In a eighth embodiment, the present invention provides a computer-implemented system for predicting an expected resolution time of a legal case, the system comprising: a computing device having a processor in electrical communication with a memory, the memory adapted to store data and instructions for executing by the processor; an outcome prediction engine operating on the computing device and comprising: a data access module adapted to access from either the memory or a database having stored therein a first set of docket entry data, the first set of docket entry data including a set of docket entries for at least one open docket having an associated set of parties related to a legal case; and a regression module when executed by the processor adapted to perform a regression calculation against docket entries associated with each party from the associated set of parties to determine an expected resolution time attribute associated with the open docket; and an output adapted to transmit a signal related to the determined expected resolution time attribute.

The system may further comprise wherein the determined expected resolution time attribute is determined based on a set of measured or detected features including one or more of: a function of the number of parties involved; the court handling the legal case, the type of issues or claims being adjudicated, the practice areas involved, the text in the docket entries, metadata associated with the docket entries, the judge assigned to the legal case, the law firm or attorneys representing parties in the legal case. The system may further comprise wherein the determined expected resolution time attribute is based on a full probability density function non-parametrically via histograms and implementing a maximum a posteriori (MAP) estimation. The system may further comprise wherein the expected resolution time attribute is determined based on a Bayesian Network Model. The system may further comprise wherein the determined expected resolution time attribute represents an estimated number of days between a filing date and a closing date as a continuous random variable $T \geq 0$ with probability density function $f(\tau)$ and cumulative distribution function $F(\tau)=\Pr\{T<\tau\}$, which gives the probability that the docket closes by day $\tau$, and T is restricted to be supported on nonnegative integers, $T \in \{0\} \cup \mathbb{Z}^+$. The system may further comprise wherein the first set of docket entry data includes data associated with docket d and $d=\{e_1, \ldots, e_\tau\}$ represents the set of docket entries from the filing date (day 1) until the resolution date (day T), and wherein each entry $e_\tau$ is a sparse vector of word-count frequencies represented by $e_\tau=(\omega_{\tau 1}, \ldots, \omega_{\tau |V|})$ where $\omega_{\tau i}$ is the frequency of term i at entry $e_\tau$ and $|V|$ is the size of the vocabulary. The system may further comprise wherein for each word in the vocabulary, $|V|$, a vector of numbers is mapped to the word and wherein each vector entry represents a latent semantic futures of the word. The system may further comprise wherein probability density function $\theta(\tau)$ is represented as a set of probability mass functions $\{f_t(\tau)\}_t$ over a time-horizon t=0, $\Delta t$, $2\Delta t$, T where $f_t(\tau) \approx f(\tau|d_t)$ and $\Delta t$ represents a time-granularity and $\tau$ follows the same scale as t, wherein $f_t$ represents the belief about the resolution time for a docket given that only docket entries entered up to time t can be observed, and $f_t(\tau)$ is the estimate of the probability that a docket will be resolved between day $\tau+\Delta t$ and day $\tau$ given entries entered up to day t. The system may further comprise wherein $f(\tau)$ is a sequence function $\{f_t\}_t$ that represents the evolving belief over time as to a predicted outcome as more information about a docket is gathered. The system may further comprise wherein $f_0$ represents an initial value determined by generating a histogram of the resolution times for dockets prior to text being entered as represented by the expression:

$$f_0(\tau) = \frac{1}{N}\sum_{n=0}^{N} 1_{[T(n)=\tau]},$$

where $1_p$ represents an indicator on predicate P, and T(n) represents the resolution time of docket n. The system may further comprise wherein Bayes' Theorem is used to update probability density function $f(\tau)$ over time as new docket entries are entered for a docket:

$$f_t + \Delta t(\tau) = \frac{g(d_{t+\Delta t} \mid \tau) f_t(\tau)}{g(d_t)}$$
$$= \frac{g(d_{t+\Delta t} \mid \tau) f_t(\tau)}{\sum_{\tau'} g(d_t \mid \tau')}$$

where $g(d_{t+\Delta t}|\tau)$ is the likelihood of observing the set of docket entries $d_{t+\Delta t}$ given that a docket is resolved between day $\tau+\Delta\tau$ and day $\tau$. The system may further comprise wherein the frequencies of terms across docket entries are independent, and the following multinomial model for the likelihood $g(d_t+\Delta t|\tau)$ is used:

$$g(d_{t+\Delta t} \mid \tau) \equiv g(\{e_1, \ldots, e_{t+\Delta t}\} \mid \tau) \approx \prod_{i=0}^{|V|} p_{ti}^{\sum_{t'=0}^{t} w_{t'i}}$$

where $p_i$ represents the empirical probabilities of observing term i by time t over all dockets in $\mathcal{D}$. The system may further comprise wherein the first set of docket entry data comprises data from a plurality of dockets $\mathcal{D}$ and and N=| $\mathcal{D}$ | is the total number of dockets under consideration. The system may further comprise wherein the outcome prediction engine is adapted to execute at least two types of predictions including Maximum A Posteriori and Expected Resolution time, wherein Maximum A Posteriori (MAP) prediction yields a prediction at time t as:

$$\hat{T}_t^{MAP} = \arg\max_\tau f_t(\tau)$$

with the mean squared error in the prediction is given by $(\hat{T}_t^{MAP}-T)^2$. The system may further comprise wherein the Expected Resolution Time (ERT) yields a prediction at time t as:

$$\hat{T}_t^{ERT} = \sum_\tau \tau f_t(\tau)$$

with the mean squared error (MSE) in the prediction is given by $(\hat{T}_t^{ERT}-T)^2$.) The system may further comprise wherein the outcome prediction engine further comprises a survival analysis module adapted to predict the docket resolution time as a function of predictors by implementing a set of functions including a survival function and a hazard function, wherein the survival function is defined at time t, where S(t), is the probability that the docket has not closed by time t expressed as:

$$S(t) = Pr\{T \geq t\}$$
$$= 1 - F(t)$$
$$= \int_t^\infty f(t')dt'.$$

The system may further comprise wherein distribution of T may also be characterized as the hazard function, $\lambda(t)$, which is the rate of change in the probability of a docket closing at time t given that it has remained open up to that point in time, as expressed by:

$$\lambda(t) = \lim_{\Delta t \to 0} \frac{Pr\{t \leq T < t+\Delta t \mid T \geq t\}}{\Delta t}.$$

The system may further comprise wherein the hazard given covariate vector $\chi_i$, is given by:

$$\lambda(t|\chi_i)=\lambda_0(t)\exp(\beta^T\chi_i).$$

The system may further comprise wherein the hazard for two individuals i and j is related by the expression:

$$\lambda(t \mid \chi_i) = \frac{\exp(\beta^T \chi_i)}{\exp(\beta^T \chi_j)}\lambda(t \mid \chi_j) = \exp(\beta^T(\chi_i - \chi_j))\lambda(t \mid \chi_j).$$

The system may further comprise further comprising means for deriving N-grams from the first set of docket entry data and applying the derived N-grams to train the regression module; and means for creating training instances from a closed docket by holding out events after a randomly selected point-in-time. The system may further comprise further comprising wherein the hazard model is a Cox outcome-time model, as expressed by:

$$\lambda(t|\chi_i)=\lambda_0(t)\exp(\beta^T\chi_i)$$

wherein a baseline hazard $\lambda_0(t)$ is common to each individual individual i represented by a vector of covariates $\chi_i$.

BRIEF DESCRIPTION OF THE DRAWINGS

In order to facilitate a full understanding of the present invention, reference is now made to the accompanying drawings, in which like elements are referenced with like numerals. These drawings should not be construed as limiting the present invention, but are intended to be exemplary and for reference.

FIG. 5 is a screenshot of an exemplary docket status screen used in the ODPE system of the present invention;

DETAILED DESCRIPTION OF THE INVENTION

The present invention will now be described in more detail with reference to exemplary embodiments as shown in the accompanying drawings. While the present invention is described herein with reference to the exemplary embodiments, and particularly with reference to outcome detection and prediction engines, it should be understood that the present invention is not limited to such exemplary embodiments. Those possessing ordinary skill in the art and having access to the teachings herein will recognize additional implementations, modifications, and embodiments, as well as other applications for use of the invention, which are fully contemplated herein as within the scope of the present invention as disclosed and claimed herein, and with respect to which the present invention could be of significant utility.

Figure 1:
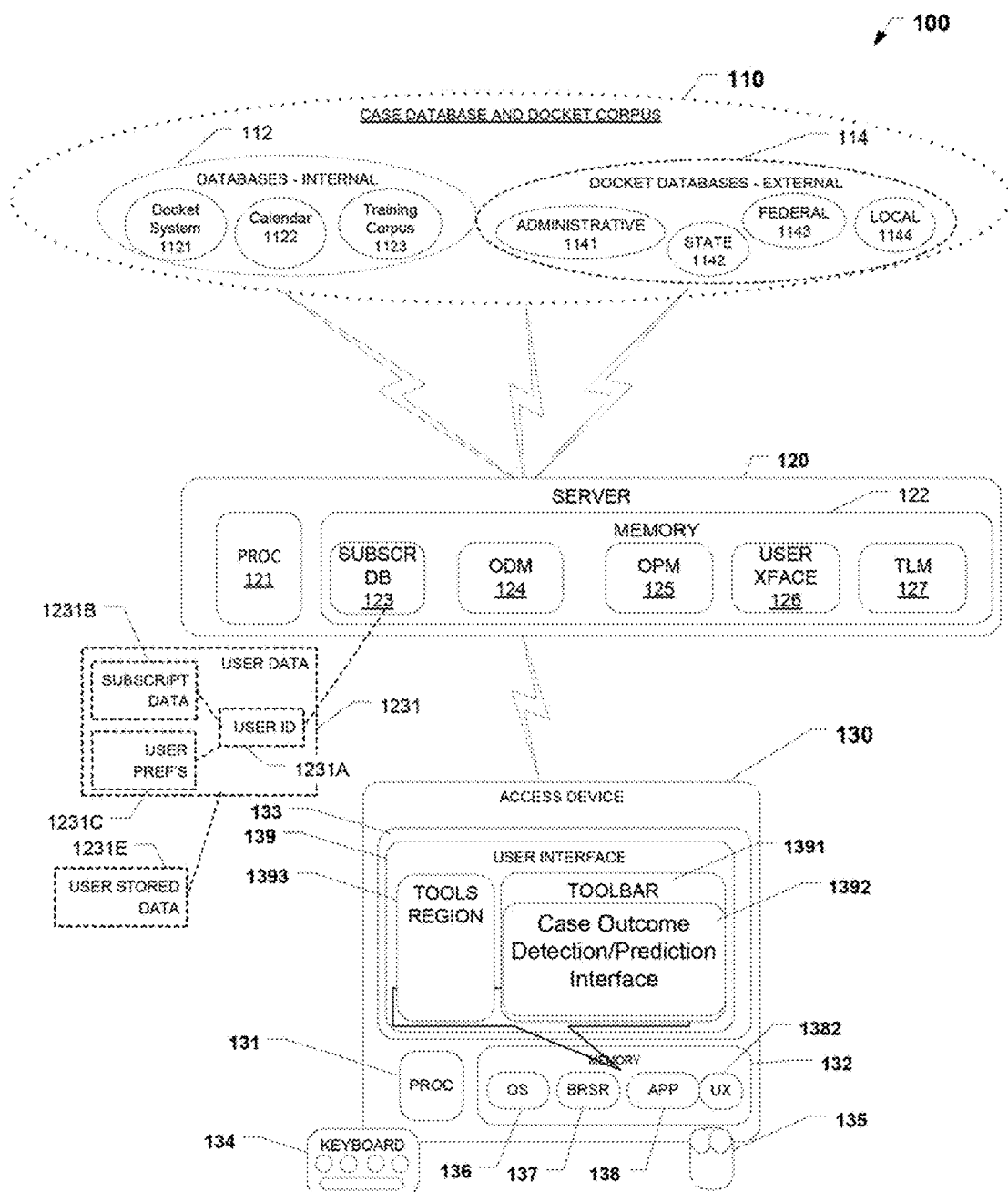
FIG. 1 is a schematic diagram illustrating an exemplary computer-based system for implementing the present invention Outcome Detection and Prediction Engine (ODPE) system or separately Outcome Detection Engine (ODE) and Outcome Prediction Engine (OPE)
Figure 2:
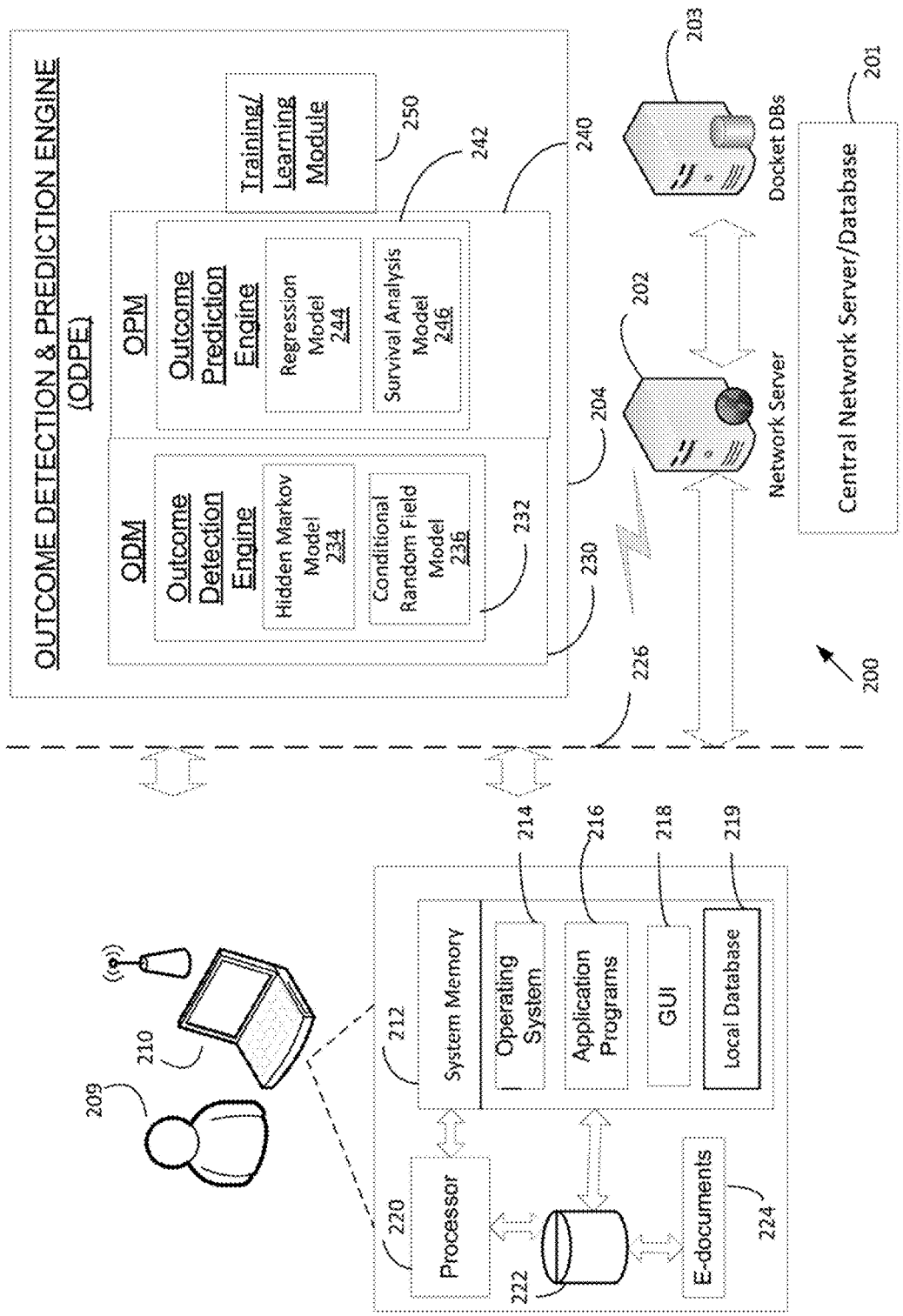
FIG. 2 is a schematic diagram illustrating an exemplary computer-based system for implementing the present invention ODPE system.

FIGS. 1 and 2 illustrate exemplary embodiments of the overall architecture of the present invention. FIG. 1 is a schematic diagram of a client/server/database architecture associated with one implementation of the Outcome Detection and Prediction Engine ("ODPE") of the present invention. While a single engine may be configured to perform both functions, the OPDE engine is alternatively implemented separately as Outcome Detection Engine (ODE) and Outcome Prediction Engine (OPE). With reference to FIG. 1, the present invention provides a ODPE system 100 that accesses information, collectively referred to at 110 as case database and docket corpus. ODPE system 100 is adapted to automatically collect and process internal and external sources of information (112, 114) relevant in collecting case docket and party information to be used to determine or predict the outcome of a case for a party or entity. Server 120 is in electrical communication with ODPE databases 110, e.g., over one or more or a combination of Internet, Ethernet, fiber optic or other suitable communication means. Server 120 includes a processor 121 and a memory 122, in which is stored executable code and data, including a subscriber database 123, an Outcome Detection Module comprising an Outcome Detection Engine 124, Outcome Prediction Module comprising an Outcome Prediction Engine 125, a user-interface module 126, and a training/learning module 127. Processor 121 includes one or more local or distributed processors, controllers, or virtual machines. Non-transitory memory 122, which takes the exemplary form of one or more electronic, magnetic, or optical data-storage devices, stores non-transitory machine readable and/or executable instruction sets for wholly or partly defining software and related user interfaces for execution of the processor 121 of the various data and modules 123-127.

Quantitative analysis, regression models, machine language training and sequence tagging models, classifier tagging models, Bayesian models, techniques or mathematics and models associated with modules 124 to 127 in conjunction with computer science are processed by processor 121 of server 120 thereby rendering server 120 into a special purpose computing machine use to transform raw data retrieved and processed from the case database and docket record/entry corpus 110, and other information into determined or predicted case outcomes for use by lawyers, clients, and other users to make decisions regarding legal activity, business activity, or other related services. This may include retrieving information from the case database and docket corpus 110 to be processed by the ODPE system 100 to determine or predict the outcome of a legal case as to a specific party or entity.

The ODPE system 100 of FIG. 1 includes an Outcome Detection Module 124 adapted to retrieve information from the case database and docket corpus 110 to determine the outcome of a case as to a specific party or entity. The Outcome Detection Module 124 further comprises an Outcome Detection Engine 232 that may comprise or implement a Hidden Markov Model and a Conditional Random Field Model to perform sequence tagging, as shown in FIG. 2. The ODPE system 100 also includes an Outcome Prediction Module 125 communicatively coupled to the case database and docket corpus 110. The Outcome Prediction Module 125 is adapted to retrieve information from the case database and docket corpus 110 to predict the outcome of a case as to a specific party or entity or to predict the time to resolution in a case for a specific party or entity. The Outcome Prediction Module 125 further comprises an Outcome Prediction Engine 242 that may comprise or implement a Regression Model or a Survival Analysis Model to predict the outcome of a case for a specific party or entity, as shown in FIG. 2.

In one exemplary implementation, the ODPE system 100 may be operated by a traditional legal information services company, e.g., Thomson Reuters, wherein ODPE database corpus or set 110 includes internal service or databases or sources of content 112, e.g., Docket System 1121, and Calendar System 1122 and Training Corpus 1123 and other internal data sources. In addition, ODPE database set 110 may be supplemented with external sources 114, freely available or subscription-based, as additional data considered by the ODPE system 100. Administrative docket database 1141 may be the source of case dockets for administrative hearings or proceedings such as those in the United States Patent and Trademark Office Trademark Trial and Appeal Board or Board of Patent Appeals and Interferences. State docket database 1142 may be the source of case dockets for state court cases at the trial or appellate level. Federal docket database 1142 may be the source of case dockets for federal court cases at the trial or appellate level such as those available through Case Management/Electronic Case Files (CM/ECF) and PACER systems. Local docket database 1142 may be the source of case dockets for local court cases at the trial or appellate level such as cases filed in small claims our county courts.

The ODPE system 100 may be implemented in a variety of deployments and architectures. ODPE data can be delivered as a deployed solution at a customer or client site, e.g., within the context of an enterprise structure, via a web-based hosting solution(s) or central server, or through a dedicated service. FIG. 1 shows one embodiment of the ODPE as comprising an online client-server-based system adapted to integrate with either or both of a central service provider system or a client-operated processing system, e.g., one or more access or client devices 130. In this exemplary embodiment, ODPE system 100 includes at least one web server that can automatically control one or more aspects of an application on a client access device, which may run an application augmented with an add-on framework that integrates into a graphical user interface or browser control to facilitate interfacing with one or more web-based applications.

Subscriber database 123 includes subscriber-related data for controlling, administering, and managing pay-as-you-go or subscription-based access of databases 110 or the ODPE service. In the exemplary embodiment, subscriber database 123 includes user data as data structures 1231, including user identification data 1231A, user subscription data 1231B, and user preferences 1231C and may further include user stored data 1231E. In the exemplary embodiment, one or more aspects of the user data structure relate to user customization of various search and interface options. For example, user ID 1231A may include user login and screen name information associated with a user having a subscription to the services accessed and distributed via ODPE system 100.

Access device 130, such as a client device, may take the form of a personal computer, workstation, personal digital assistant, mobile telephone, or any other device capable of providing an effective user interface with a server or database. Specifically, access device 130 includes a processor module 131 including one or more processors (or processing circuits), a memory 132, a display 133, a keyboard 134, and a graphical pointer or selector 134. Processor module 131 includes one or more processors, processing circuits, or controllers. Memory 132 stores code (machine-readable or executable instructions) for an operating system 136, a browser 137, outcome detection and prediction display software 138, and user interface tools 1382. In the exemplary embodiment, operating system 136 takes the form of a version of the Microsoft Windows operating system, and browser 137 takes the form of a version of Microsoft Internet Explorer. Operating system 136 and browser 137 not only receive inputs from keyboard 134 and selector 135, but also support rendering of graphical user interfaces 139 on display 133. Upon launching processing software an integrated ODPE graphical-user interface 139 is defined in memory 132 and rendered on display 133. Upon rendering, interface 139 presents data in association with one or more interactive control features such as user interface tools region 1393, toolbar 1391, and ODPE interface 1392. The interface 1392 may incorporate, comprise, or consist of a variety of existing software solutions or GUIs.

In one embodiment of operating a system using the present invention, an add-on framework is installed and one or more tools or APIs on server 120 are loaded onto one or more client devices 130. In the exemplary embodiment, this entails a user directing a browser in a client access device, such as access device 130, to Internet-Protocol (IP) address for an online information-retrieval system, such as offerings from Thomson Reuters, Thomson IP, Westlaw, CM/ECF, PACER and other systems, and then logging onto the system using a username and/or password. Successful login results in a web-based interface being output from server 120, stored in memory 132, and displayed by client access device 130. The interface includes an option for initiating download of information integration software with corresponding toolbar plug-ins for one or more applications. If the download option is initiated, download administration software ensures that the client access device is compatible with the information integration software and detects which document-processing applications on the access device are compatible with the information integration software. With user approval, the appropriate software is downloaded and installed on the client device. In one alternative, an intermediary "firm" network server, such as one operated by a financial services customer, may receive one or more of the framework, tools, APIs, and add-on software for loading onto one or more client devices 130 using internal processes.

Once installed in whatever fashion, a user may then be presented an online tools interface in context with a document-processing application. Add-on software for one or more applications may be simultaneous invoked. An add-on menu includes a listing of web services or application and/or locally hosted tools or services. A user selects via the tools interface, such as manually via a pointing device. Once selected the selected tool, or more precisely its associated instructions, is executed. In the exemplary embodiment, this entails communicating with corresponding instructions or web application on server 120, which in turn may provide dynamic scripting and control of the host word processing application using one or more APIs stored on the host application as part of the add-on framework.

With reference to FIG. 2, the above processes, and as discussed in more detail below, may be carried out in conjunction with the combination of hardware and software and communications networking illustrated in the form of exemplary ODPE system 200. In this example, ODPE system 200 provides a framework detecting and predicting the outcome of cases for a particular party or entity. ODPE system 200 may be used in conjunction with a system offering of a professional services provider, e.g., Monitor-Suite, a product and service of Thomson Reuters Corporation, and in this example includes a Central Network Server/Database Facility 201 comprising a Network Server 202, a plurality of Docket databases 203, e.g., those shown in case database and docket corpus 110 in FIG. 1, and other publicly and privately available services. ODPE 204 having as components a Outcome Detection Module 230, a Outcome Prediction Module 240, and a Training/Learning Module 250.

The Outcome Detection Module 230 comprises an Outcome Detection Engine 232 having as components a Hidden Markov Model 234 and a Conditional Random Field model 236. The Outcome Prediction Module 240 comprises an Outcome Prediction Engine 242 having as components Regression Model 244 and Survival Analysis Model 246. The Training/Learning Module 250 is adapted to train the models in the modules 230 and 240 from a training corpus or by user assisted training and learning processes.

The Central Facility 201 may be accessed by remote users 209, such as via a network 226, e.g., Internet. Aspects of the ODPE system 200 may be enabled using any combination of Internet or (World Wide) WEB-based, desktop-based, or application WEB-enabled components. The remote user system 209 in this example includes a GUI interface operated via a computer 210, such as a PC computer or the like, that may comprise a combination of hardware and software including, as shown in respect to computer 210, system memory 212, operating system 214, application programs 216, graphical user interface (GUI) 218, local database 219, processor 220, and storage 222 which may contain electronic information 224 such as electronic documents. The methods and systems of the present invention, described in detail hereafter, may be employed in providing remote users access to a searchable database.

Client side application software may be stored on machine-readable medium and comprising instructions executed, for example, by the processor 220 of computer 210, and presentation of web-based interface screens facilitate the interaction between user system 209 and central system 201. The operating system 214 should be suitable for use with the system 201 and browser functionality described herein, for example, Microsoft Windows operating systems commonly available and widely distributed. The system may require the remote user or client machines to be compatible with minimum threshold levels of processing capabilities, minimal memory levels and other parameters.

The configuration thus described in this example is one of many and is not limiting as to the invention. Central system 201 may include a network of servers, computers and databases, such as over a LAN, WLAN, Ethernet, token ring, FDDI ring or other communications network infrastructure. Any of several suitable communication links are available, such as one or a combination of wireless, LAN, WLAN, ISDN, X.25, DSL, and ATM type networks, for example. Software to perform functions associated with system 201 may include self-contained applications within a desktop or server or network environment and may utilize local databases, such as SQL 2005 or above or SQL Express, IBM DB2 or other suitable database, to store documents, collections, and data associated with processing such information. In the exemplary embodiments the various databases may be a relational database. In the case of relational databases, various tables of data are created and data is inserted into, and/or selected from, these tables using SQL, or some other database-query language known in the art. In the case of a database using tables and SQL, a database application such as, for example, MySQL™ SQLServer™, Oracle 8I™, 10G™, or some other suitable database application may be used to manage the data. These tables may be organized into an RDS or Object Relational Data Schema (ORDS), as is known in the art.

A first function of the present invention is outcome detection for a specific party in a case by the Outcome Detection Engine. For the Outcome Detection Engine, given a sequence of docket entries, a sequence tagging algorithm is trained on the docket entries and with respect to all parties involved in the case. Annotated data is used for training a Hidden Markov Model (HMM) and/or Conditional Random Field (CRF) model in order to determine the docket entry a certain outcome has been reached. Training is done for every party and the entries, for example, when a party leaves a room (e.g. settles) are marked accordingly. The features may be derived from n-grams of the text found in the dockets. At run time (i.e., case or event outcome detection time), a sequence tagging classifier is run over a new docket for all parties to determine when the respective party generates an outcome. In case the classifier is not able to determine an outcome, the status is defined as open for the remaining parties. The Outcome Detection Engine may be implemented with the two algorithms (HMM,CRF), and may be used with a set of code to process large amounts of dockets via a SPARK implementation.

A second function of the present invention is outcome prediction for a specific entity or party in a case by the Outcome Prediction Engine. For the Outcome Prediction Engine, given a sequence of n docket entries and an open status for all or a subset of the involved parties, a regression algorithm can determine the remaining time to resolution (i.e., an outcome has been reached). The docket data provides information about the time to resolution and the n-grams derived from the docket entries are used for training a regression algorithm that predicts the remaining time at a given time t based on the docket entries created up to that point. The regression algorithms are based on multi-nominal Naïve Bayes and Survival analysis. The Outcome Prediction engine may be implemented using Python code (www.python.org) to pre-process dockets and train a Naïve Bayes algorithm and R code (R programming language is a well known implementation of the S programming language combined with lexical scoping semantics for statistical computing, data mining and analytics) to run the Survival Analysis predictions. The Outcome Prediction Engine could be extended by actually predicting the outcome of a case for a specific party as well as predicting the time to resolution for a specific party. Other machine learning approaches including deep learning approaches may be implemented with the Outcome Prediction Engine to improve the accuracy and speed of the invention.

Outcome Detection

The present invention extends the Naïve Bayes model from text classification to the outcome duration prediction task by discretizing the durations and treating the problem like a multi-class classification problem, with a separate class for each time bucket. The formulation is also extended to allow landmarking, so that predicted durations can be updated in the light of progress in the case.

The classical multiclass Naïve Bayes model for text arises from Bayes Theorem, that $P(C|X)$ is proportional to $P(C)P(X|C)$. For example, suppose from the filing of a case, the case is observed for a certain time t (called the "landmark time"), and then a prediction is made which time bucket out of a finite number contains the true time-to-outcome of the case. Also, suppose a large collection of historical cases with known time-to-outcome. In the Bayes Classifier description, C is now the time-to-outcome bucket being predicted, and X is relevant information about the docket up to time t—here it is the text of the docket entries. The set of historical cases are used to estimate $P(C)$ and $P(X|C)$. The first quantity can be estimated empirically by analyzing the number of cases in each time-to-outcome bucket. To estimate the second quantity $P(C|X)$, there is a traditional assumption (conditional independence) that $P(x_1, x_2, \ldots, x_d|C)=P(x_1|C) P(x_2|C) \ldots P(x_d|C)$, where the $x_i$ are different attributes or "features" of the item to be predicted. In the case of dockets, the conditional independence assumption implies that $P(X|C)$ is independent in each word AND each docket entry. To finally estimate the quantity of interest the varying levels of each attribute must also be addressed. One approach for attributes which are discrete counts (e.g., words) is to assume the independence of repetitions; this gives a straightforward way to estimate $P(x_i|C)$. In textual prediction, this can be interpreted as the probability of random position in a document with label C begin filled in by word $x_i$.

It is important to note that the corpus of documents which is used to estimate these quantities differs by the landmark time t. As t becomes larger, there is a higher chance that a case will close before it leaves the observation period. In this event, these cases are not used to compute the $P(C)$ or $P(X|C)$ values for a particular t.

A true survival model improves on this picture in a number of ways. First, there is no discretization of the time-to-outcome bins, which allows some improvements. For instance, features which effectively predict that a case will terminate in a very long time might be split up by the discretization and not have enough probability mass to affect the outcome. A true survival model can also handle more sophisticated landmarking. It doesn't require an independence assumption about events (docket entries) prior to the landmark. These can be modeled according to their position in the timeline.

The following describes the functions and features of the Outcome Detection Engine and Outcome Prediction Engine in more detail.

Figure 3:
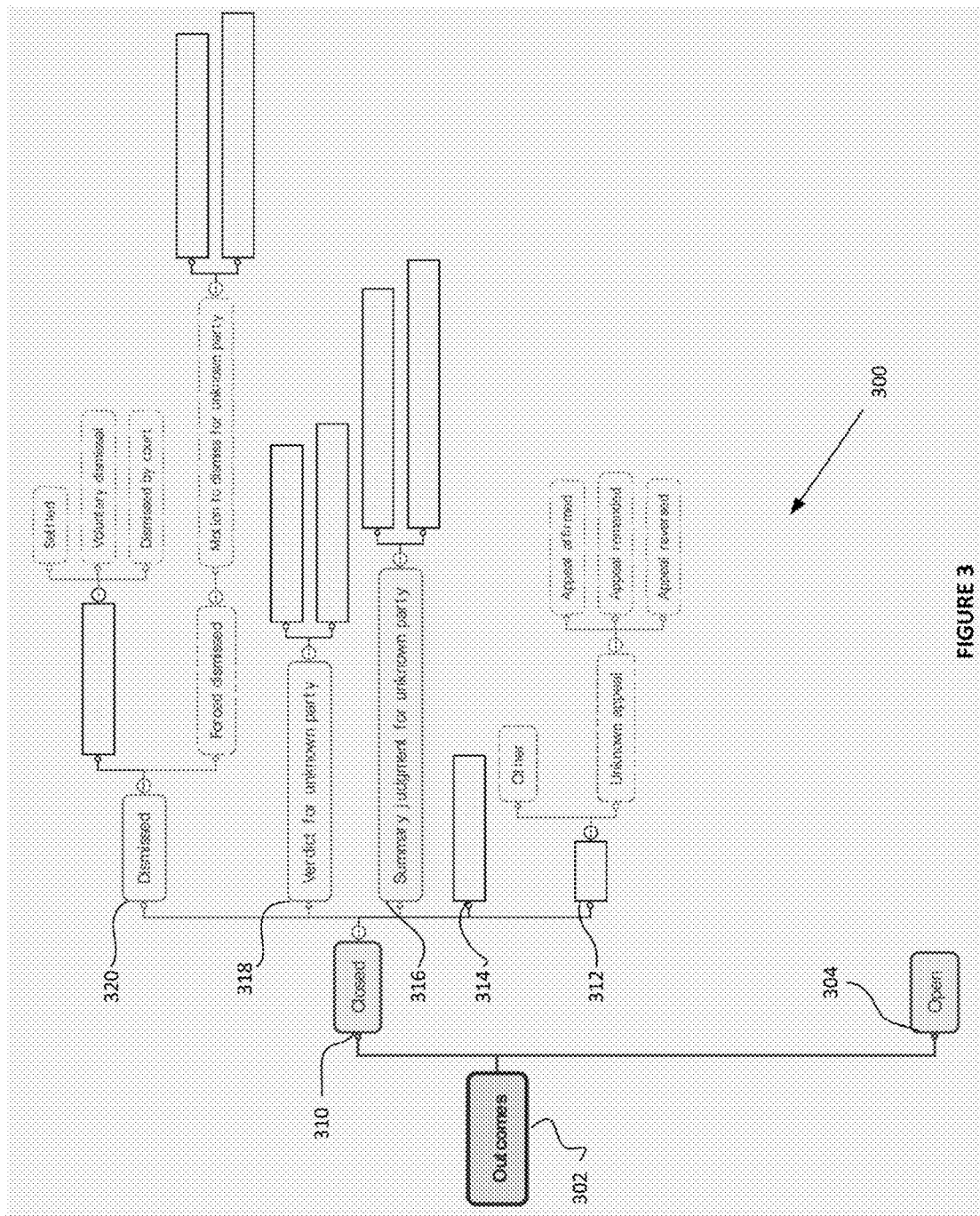
FIG. 3 is an example taxonomy of case outcomes used in the present invention ODPE system.
Figure 4:
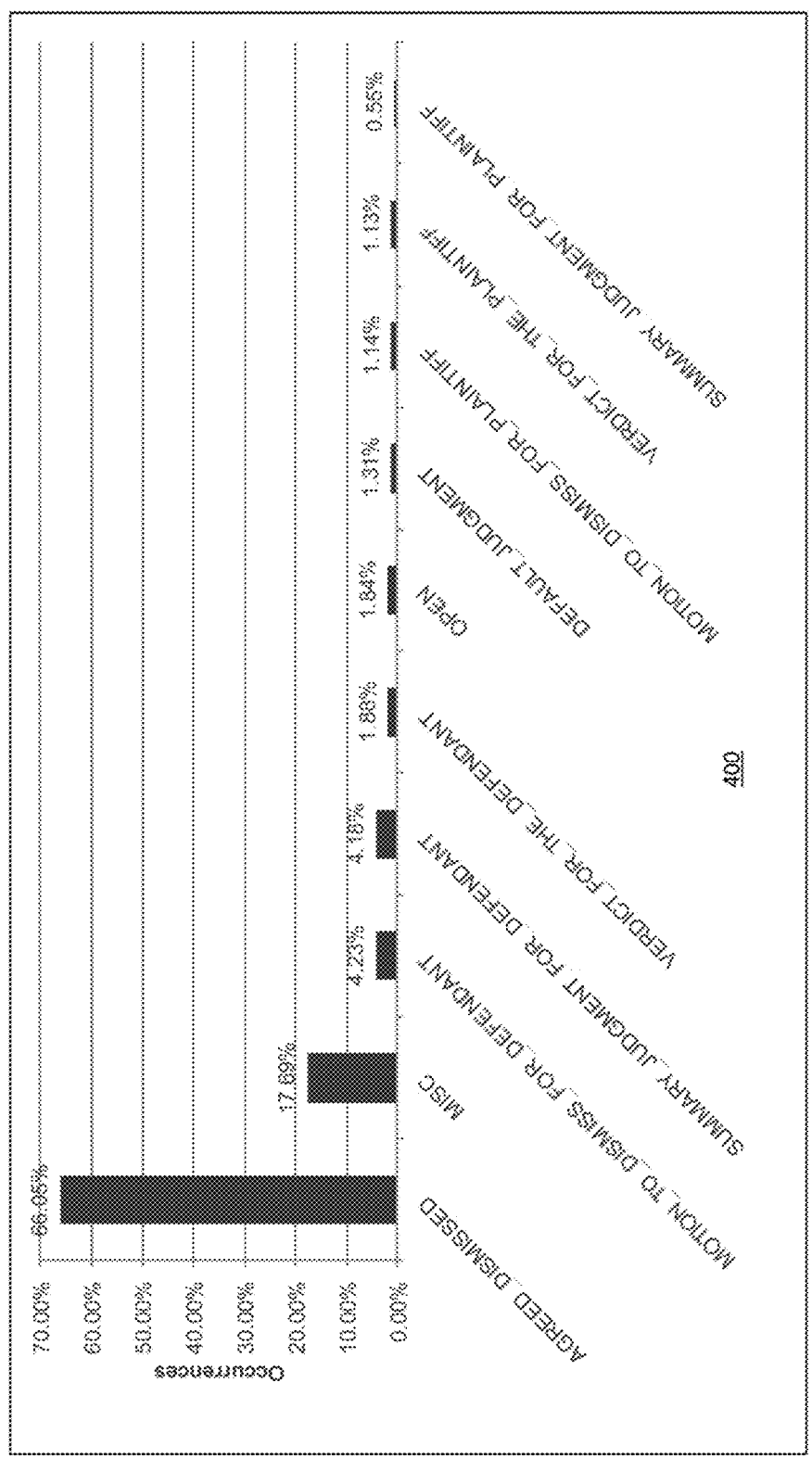
FIG. 4 is a graph illustrating the frequency of each outcome in the taxonomy of case outcomes of the present invention.

Sequence-based approaches to docket outcome classification may be used in outcome prediction and detection. The task of case outcome detection by an Outcome Detection engine is to summarize the outcome of a lawsuit or other proceeding with respect to each party based on a taxonomy of outcomes, as well as to identify relevant case docket entries. An example taxonomy of outcomes 300 is shown in FIG. 3. The taxonomy of outcomes 300 starts at outcome set 302, and the first "layer" of outcomes is either open 304 or closed 310. In the closed 310 status, a party in a case may be labeled as miscellaneous outcome 312, default judgment 314, summary judgment for unknown party 316, verdict for unknown party 318, or dismissed 320. Additional outcomes of increasing granularity may also be used. The frequency of each outcome is illustrated in the graph 400 in FIG. 4.

The basis for determining the outcome of a case or lawsuit (or other proceeding) is modeling every lawsuit according to a "room model". A "room model" is so named because it treats the task of determining the outcome of a case as analogous to observing the door of a room where people are gathered. It is easy for an observer to determine when people enter or exit the hypothetical room, but the observer has no direct knowledge of what is going on in the room. Similarly, the proceedings of a lawsuit cannot be observed from the outside (as full text pleadings, briefs, and decisions are not available or for the sake of processing economy are not considered), but the docket provides a record of parties leaving the case.

There are many possible ways to annotate case outcomes. In general any party can have several simultaneous outcomes with respect to any other party, down to the level of individual claims in its pleadings. Moreover, the same party could be both a defendant and (counter) plaintiff simultaneously. The room model guides a simplified annotation scheme because the assumption is made for the purposes of the model that the event that allows/forces the party to "leave the room" is the most significant. Thus, in one exemplary implementation, each party is tagged with a single outcome.

Implementing the room model for outcome detection is also beneficial because it is easily improved by or implemented with sequence learning algorithms. The room model analogy is also beneficial for outcome detection because it enables educated assumptions about a party or entity's status to be determined. For example, if it cannot be determined that a person has "left the room", but it is subsequently observed that the person leaves the room, it can be assumed that the person was in the room at the earlier point in time. That is, there are logical dependencies from the ordering of events that can be exploited by a sequence tagging approach.

Previous approaches and methods used in the prior art implemented clerk-entered termination dates to localize to the docket entries containing the outcome. These docket entries were classified to get the outcome type. However, clerks are inconsistent about adding this information to dockets. In an example data set, it was found that only approximately 60% of the termination dates were filled in. The lack of data presents the most serious difficulty for the prior art approaches, since the localization information provided by the clerk otherwise has to be inferred by the classifier, which is likely less accurate.

For example, FIG. 5 provides an exemplary docket status screen 500. In the docket status screen 500, information such as the date the case was closed 502 and the case status 504 is provided. Closed date 502 is used infrequently and is not always filled out properly, the same is true for the case status 504. Additionally, a list of participants and their relevant information 506 is provided. For participant Travelers Property Casualty Company of America 510 information such as the party type 512 and date party was removed from the case 514 may be provided. The removal date 514 is important because some parties may be removed from a case early. Additional problems for the OPDE include parties that don't have a terminate date 514 but have been terminated, "open" case dockets that are technically closed or inactive, and parties and dates not correctly identified or entered in the case docket.

For outcome prediction or detection, it is important to determine the case status. In the Outcome Detection Engine, a conditional random field (CRF) is used to implement a sequence tagging (case outcome) classifier. Outcomes are predicted independently for each party in the lawsuit. Each docket is presented in chronological order, beginning with the OPEN state. At the point where the party is terminated from the case, the state switches to whatever the termination reason is (such as summary judgment for plaintiff) and remains that way for the duration of the case. The main components or features of the sequence tagging classifier are the masker, featurization, classification, and interparty inference.

The masker may be code that recognizes dates and names and replaces them with generalized placeholders. For instance, dates are changed to TODAY, PAST_DATE, or FUTURE.DATE relative to the date of the docket entry. Party names are changed to THIS_PARTY (for the party whose outcome is being determined) and OTHER_PARTY (any other party) and augmented with the party's role in the case. Masking other names, such as lawyers names and clerk or judge names may also be implemented to provide additional information beyond determining the outcome for a particular party or entity.

For the next component, featurization, the masked text is tokenized with, for example, n-grams up to length 4. In addition, previous and future docket entries (up to 5) are presented with additional unigram and bigram features. Features arising from previous and future docket entries are in a separate feature space from the features generated by the docket entry of interest.

For the classification component, a Wapiti CRF toolkit is used to train and make predictions. When the clerk-entered termination date is available, the CRF prediction can be pinned to the termination date in order to produce a better quality outcome. The CRF predictions follow the pattern of a single state transition away from OPEN, and remain at that state for the duration of the case. For cases or parties that fall into an exception, the Outcome Detection Engine may coerce the predicted exception sequence into a proper form.

With the interparty inference component, an optional final step may be taken to obtain party-by-party outcomes. Given a pair of parties, the inference assigns the outcome associated with the earlier-terminated party.

Figure 6:
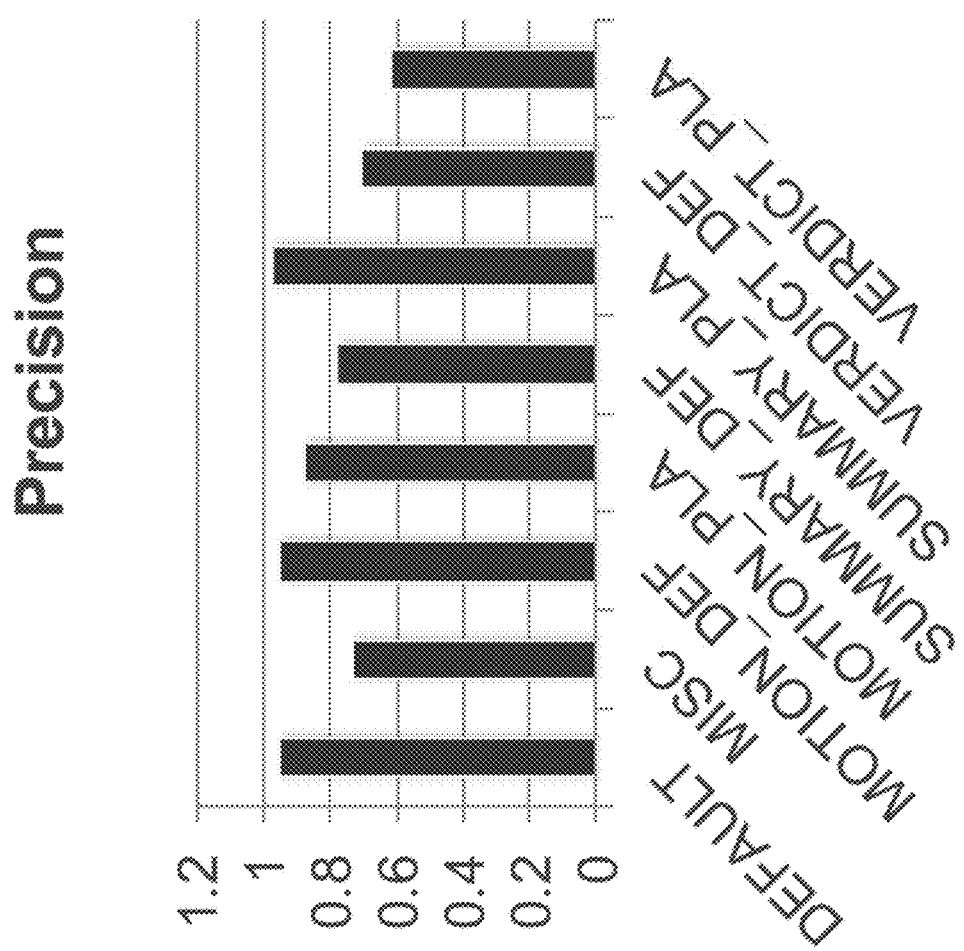
FIG. 6 is graph illustrating the precision of the ODPE system of the present invention in detecting case outcomes.

The sequence-based model used in the Outcome Detection Engine reduces the party-by-party error nearly by half compared to the systems and method of the prior art. Moreover, this improved result may be obtained while completely ignoring clerk-entered termination dates. Therefore, the Outcome Detection Engine of the present invention is largely immune to the missing data issue that causes problems and inaccuracies in the prior art systems and methods. The precision of the detection of the outcome of a case for a particular party using the Outcome Detection Engine is illustrated in FIG. 6. The precision of determining the outcome varies based on the disposition of the case for a particular party.

Figure 9:
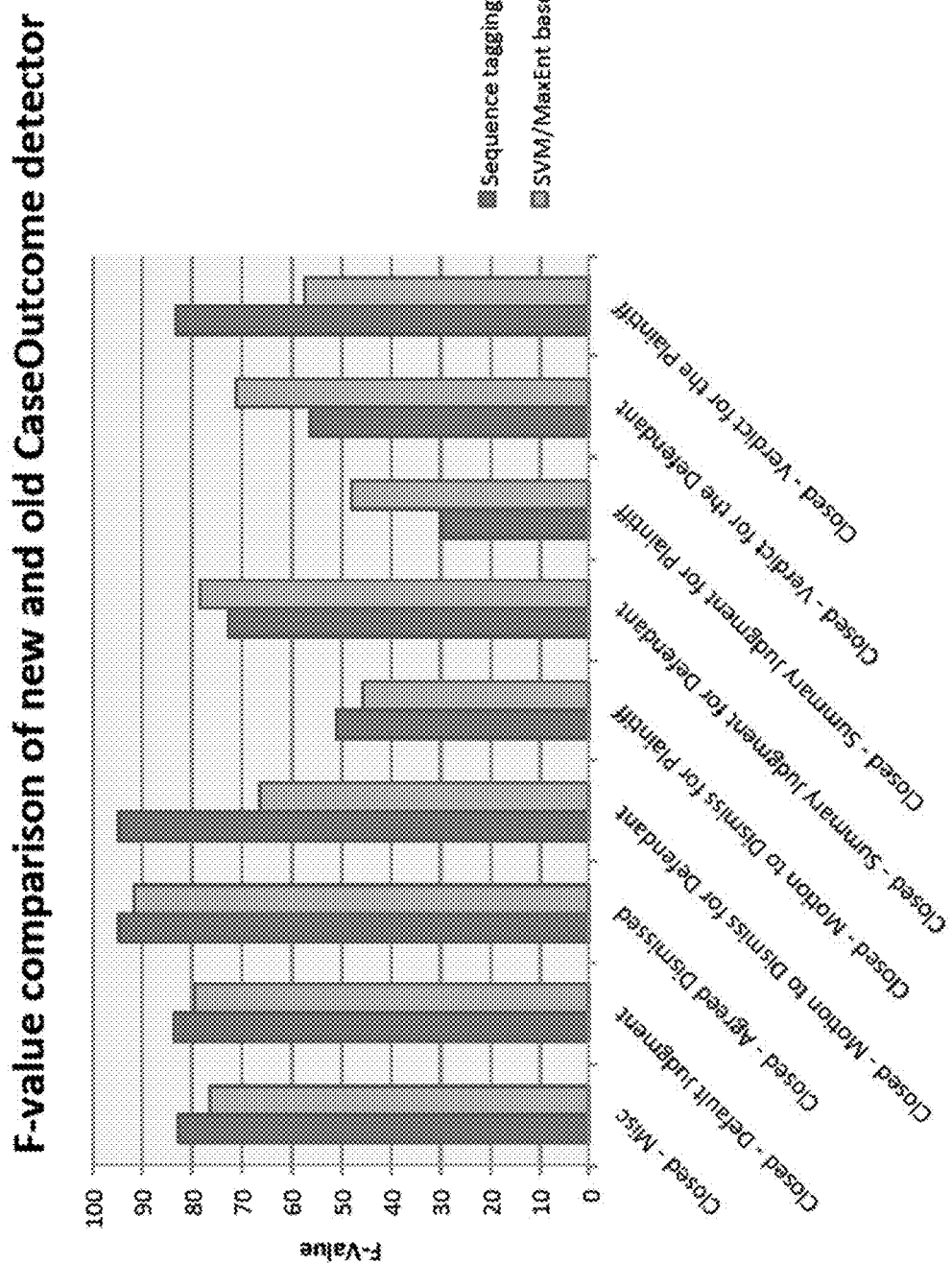
FIG. 9 is a graph illustrating the accuracy, measured by F-value, of detecting a case outcome using the Outcome Detection Engine and sequence tagging of the present invention compared to an existing source vector machine ("SVM")/Maximum Entropy (MaxEnt)-based system.

Additionally, the accuracy, measured by F-value, of detecting a case outcome using the Outcome Detection Engine and sequence tagging of the present invention compared to an existing source vector machine ("SVM")/Maximum Entropy (MaxEnt)-based system is shown in FIG. 9 with the present invention being more accurate overall than the known SVM/MaxEnt systems.

Prediction of Docket Resolution Times

An additional inventive aspect extending beyond detecting outcomes is predicting outcomes, for example for parties involved in legal cases. The present invention provides an Outcome Prediction Engine adapted to predict the resolution time of a docket based on a set of measured or detected features, for example an outcome may be predicted as a function of the number of parties involved, the court jurisdiction, the practice area, the text in the docket entries, the judge, etc. Instead of obtaining a point-estimate of the resolution time using regression methods, the prediction engine of the present invention characterizes the full probability density function non-parametrically (via histograms) and implements maximum a posteriori (MAP) estimation to obtain outcome predictions. An advantage of this approach is that the Outcome Prediction Engine can obtain confidence intervals for the predictions.

If a prediction as to the outcome of a case or matter is desired at the time the case is filed, the only available information is that which is available at the time of filing including metadata that is entered at filing, the practice area, the court jurisdiction, the number and names of the parties involved, etc. Predicting the outcome at this stage of a case is a static prediction problem. In a static prediction problem, it is not possible to update the predictions as new information is added to the docket, e.g. motion filings, party dismissals, transfer orders, etc. without re-fitting the regression parameters.

However, if the problem is instead characterized as one wherein a prediction as to the outcome is made every certain number of days after filing, e.g. as docket entries are being entered and new information about the case is being gathered, the problem is a dynamic problem. For example, if a motion of a certain type is filed by one of the parties, this might signal that the case could take less time to be resolved than previously predicted. In this case, where the prediction task is dynamic; it is necessary to formulate a model that captures a time-changing "belief" (appraisal, estimation, or confidence level) about the time it will take for a case to close or be resolved.

The Outcome Prediction Engine functions by describing or defining the dataset, defining the dynamic problem mathematically, applying Bayesian solution approach and presenting a set of results. Survival analysis may also be implemented as a tool for estimating the effect of different factors on case resolution time.

The following algorithms and methods for use in the Outcome Prediction Engine are described as being applied to a dataset that contains information for civil federal dockets filed between Sep. 27, 2009 and Oct. 26, 2014, with a distribution of approximately 6,000 dockets per week. The total number is 1,544,307 dockets.

For each docket, a filing date, a closed date (may be missing), the court jurisdiction by district, categorization and sub-categorization based on nature of suit, names of parties and their legal representation, names of the judge or judges, time stamped docket entries and other miscellaneous information are provided.

First, a Bayesian Network Model for predicting docket resolution time may be applied. For this model, it is assumed that a separate model may be customized or implemented for every practice area-state combination, i.e. different models may be implemented for personal injury cases in New York, product liability cases in New York, and personal injury cases in California, etc. The model may be generalized to identify practice areas and jurisdictions that have "similar" dockets and aggregate them together, or to introduce additional predictors that account for these other variables. It is assumed that each model represents a homogenous subset of cases coming from the same state and the same practice area. In particular, for the set of dockets described above, social security and intellectual property dockets in New York and California are examined.

The resolution time for a docket is defined as the number of days between its filing date and closing date. If a docket is marked as closed but there is no closed date available, the resolution time is defined as the number of days between its filing date and the date of its latest docket entry. The resolution time in days is a continuous random variable $T \geq 0$ with probability density function $f(\tau)$ and cumulative distribution function $F(\tau)=\Pr\{T<\tau\}$, which gives the probability that the docket closes by day $\tau$. T is restricted to be supported on nonnegative integers, $T \in \{0\} \cup \mathbb{Z}^+$.

The name or number of parties or name of the judge are not necessarily captured and are not necessary to predicting the outcome for a party in a particular case. The dockets in the example dataset are explicitly represented only by the text in the docket entries. Assume $\mathcal{D}$ is the set of dockets and $N=|\mathcal{D}|$ is the total number of dockets under consideration.

A docket $d=\{e_1, \ldots e_\tau\}$ is the set of entries from the filing date (day 1) until the resolution date (day T). Each entry $e_\tau$ is a sparse vector of word-count frequencies, i.e. $e_\tau=(\omega_{\tau 1}, \ldots, \omega_{\tau|V|})$ where $\omega_{\tau i}$ is the frequency of term i at entry $e_\tau$ and $|V|$ is the size of the vocabulary. Additionally, $d_t=\{e_1, \ldots, e_t\}$ is the set of entries entered no later than day t. Finally, $d_{th}=\{e_{t-h}, \ldots e_t\}$ is a filtered set of entries entered from day t–h up to day t.

For a given docket d, the problem of computing the set of probability mass functions $\{f_t(\tau)\}_t$ over a time-horizon $t=0$, $\Delta t$, $2\Delta t$, T where $f_t(\tau) \equiv f(\tau|d_t)$ and $\Delta t$ represents the time-granularity of the model is considered. Note that $\tau$ follows the same scale as t.

In other words, $f_t$ represents the belief about the resolution time for a docket given that only docket entries entered up to time t can be observed, and $f_t(\tau)$ is the estimate of the probability that a docket will be resolved between day $\tau+\Delta t$ and day $\tau$ given entries entered up to day t. Here, a sequence function $\{f_t\}_t$ is obtained that represents the evolving belief as to the predicted outcome as more information about a docket is gathered.

The prediction process begins with a prior belief $f_0$ that is approximated by generating a histogram of the resolution times for all dockets before any text is entered. That is, $$f_0(\tau) = \frac{1}{N} \sum_{n=0}^{N} 1_{\{T(n)=\tau\}}.$$

where $1_p$ the indicator on predicate a P, and T (n) is the resolution time of docket n.

Bayes' Theorem is then used to update the beliefs as new entries are entered for a docket:

$$f_t + \Delta t(\tau) = \frac{g(d_{t+\Delta t} \mid \tau) f_t(\tau)}{g(d_t)}$$
$$= \frac{g(d_{t+\Delta t} \mid \tau) f_t(\tau)}{\sum_{\tau'} g(d_t \mid \tau')}$$

Here, $g(d_{t+\Delta t}|\tau)$ is the likelihood of observing the set of entries $d_{t+\Delta t}$ given that a docket is resolved between day $\Sigma+\Delta \tau$ and day $\tau$.

Assuming that the frequencies of the terms across docket entries are independent, a multinomial model for the likelihood $g(d_t+\Delta t|\tau)$ is used:

$$g(d_{t+\Delta t}|\tau) \equiv g(\{e_1, \ldots, e_{t+\Delta t}\}|\tau) \approx \prod_{i=0}^{|V|} p_{ti}^{\sum_{t'=0}^{t} w_{t'i}}$$

where $p_i$ are the empirical probabilities of observing term i by time t over all dockets in $\mathcal{D}$.

At any given point in time, the belief about a case can be used to make statements about how likely it is for the case to be resolved in a range of time. The accuracy of the algorithm may be evaluated by computing point estimates that can be compared to the true resolution time.

Given that the beliefs as to the predicted outcome are updated over a time horizon, point estimates can be produced every time the prediction as to the outcome is updated. That is, every time the belief about the predicted outcome of the case as to a party is updated, a point prediction about when it is estimated the case will close can be predicted. This means that the performance of the predictor will vary over the time horizon, e.g. the prediction accuracy will improve (but could worsen) as new entries are added to the docket.

At any given time, two types of predictions can be made, Maximum A Posteriori and Expected Resolution time. The Maximum A Posteriori (MAP) prediction gives the resolution time that the model determines has the highest likelihood of occurring. The MAP prediction at time t is given by:

$$\hat{T}_t^{MAP} = \arg\max_\tau f_t(\tau)$$

and the mean squared error in the prediction is given by $(\hat{T}_t^{MAP} - T)^2$.

The Expected Resolution Time (ERT) gives an average estimated resolution time based on the current belief. The ERT prediction at time t is given by:

$$\hat{T}_t^{ERT} = \sum_\tau \tau f_t(\tau)$$

and the mean squared error in the prediction is given by $(\hat{T}_t^{ERT} - T)^2$.

Figure 8:
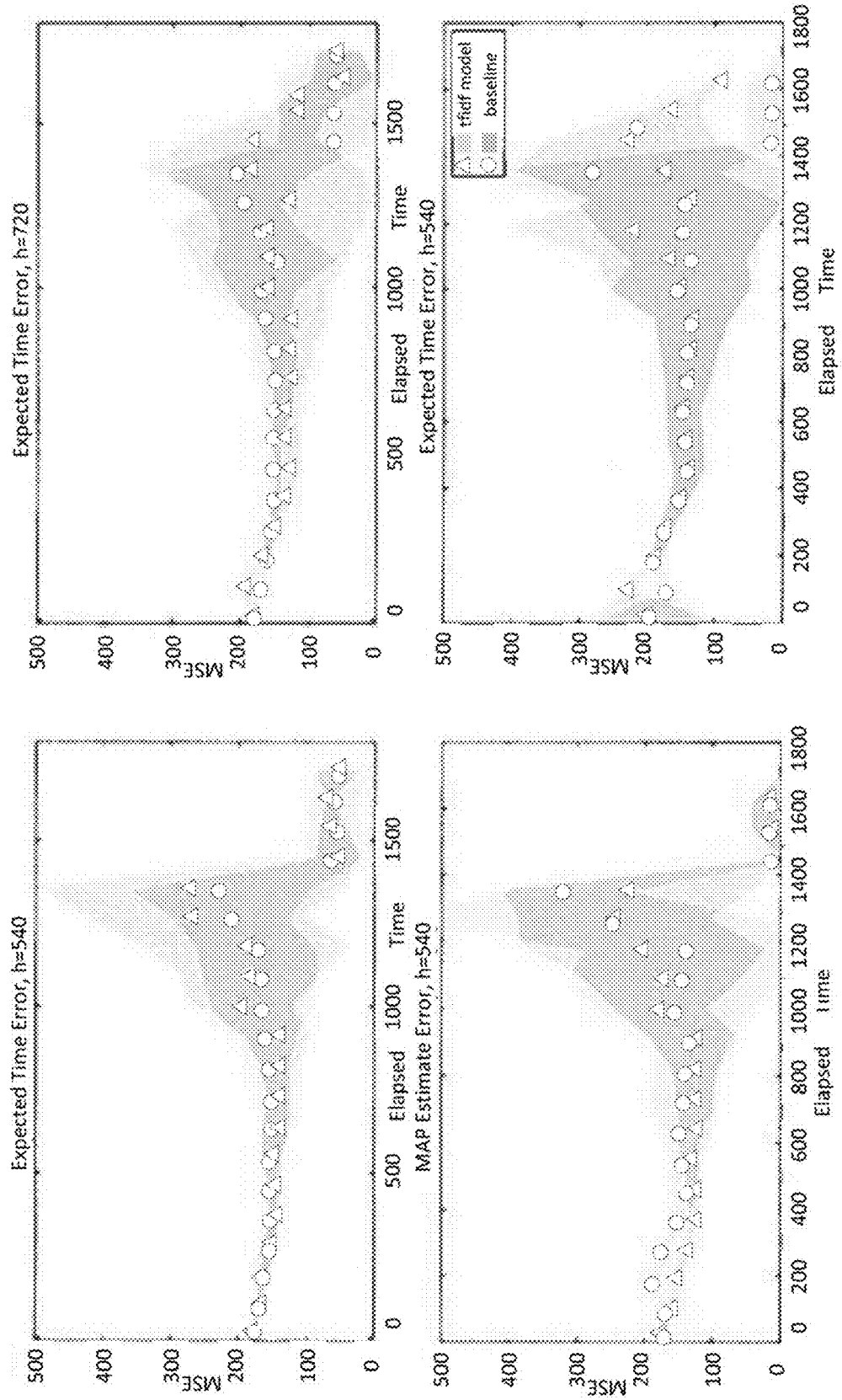
FIG. 8 is a set of graphs illustrating the accuracy of the model used in the Outcome prediction Engine of the ODPE system of the present invention.

In order to assess the value of the prediction model, both types of predictions are compared to a Naïve model that does not take into account text. That is, the baseline model that the Outcome Prediction Engine is compared to is a renormalized prior and represents the best could be achieved if the Outcome Prediction Engine did not have access to the entry text. Because the Outcome Prediction Engine has access to the entry text it will outperform the Naïve model. In FIG. 8, the accuracy of the model used in the Outcome Prediction Engine on a subset of dockets from New York State related to social security is shown. FIG. 8 provides a plot of the mean square error (MSE) for the MAP/ERT and baseline predictions for h=540 and h=720. The circles and triangles represent the mean MSE and the shaded area represents ±standard error from the mean.

The Outcome Prediction Engine of the present invention may also be used in modeling (and predicting) the docket resolution time as a function of predictors. A survival analysis model implementing a survival function may be used to predict the docket resolution time as a function of predictors. The survival analysis model may implement a set of functions including a survival function and a hazard function. The survival function is defined at time t, where S(t), is the probability that the docket has not closed by time t. Mathematically:

$$S(t) = Pr\{T \geq t\}$$
$$= 1 - F(t)$$
$$= \int_t^\infty f(t')dt'$$

The distribution of T may also be characterized as the hazard function, $\lambda(t)$, which is the rate of change in the probability of a docket closing at time t given that it has remained open up to then. It is defined by:

$$\lambda(t) = \lim_{\Delta t \to 0} \frac{Pr\{t \leq T < t + \Delta t \mid T \geq t\}}{\Delta t}$$

Using the definition of S(t) and $f(t)$, we can rewrite $\lambda(t)$ as:

$$\lambda(t) = \frac{f(t)}{S(t)}$$
$$= -\frac{1}{S(t)} \frac{dS(t)}{dt}$$
$$= -\frac{d}{dt} \log S(t)$$

Cox (1972) proposed a way to model the hazards of a population, where each individual i is represented by a vector of covariates $\chi_i$. In the Cox outcome-time model, there is baseline hazard $\lambda_0(t)$ which is common to all individuals, and it is increased or decreased for each individual by an exponential function of the covariates. Cox, D. R. "Regression Models and Life Tables (with Discussion)." Journal of the Royal Statistical Society Series B 34 (1972): 187-220. Mathematically, under this model, the hazard for individual with covariate vector $\chi_i$, the hazard is given by:

$$\lambda(t \mid \chi_i) = \lambda_0(t) \exp(\beta^T \chi_i)$$

The hazard for two individuals i and j is related by:

$$\lambda(t \mid \chi_i) = \frac{\exp(\beta^T \chi_i)}{\exp(\beta^T \chi_j)} \lambda(t \mid \chi_j)$$
$$= \exp(\beta^T (\chi_i - \chi_j)) \lambda(t \mid \chi_j)$$

hence the name "proportional hazards."

Since the model used in the Outcome Prediction Engine is a dynamic model, the data is divided according to landmark times and one Cox model is generated for each landmark time. That is, for each model, the input is the set of n-grams contained in docket entries that were entered after the landmark time. The Cox model is trained using the methods in the glmnet R package.

Figure 7:
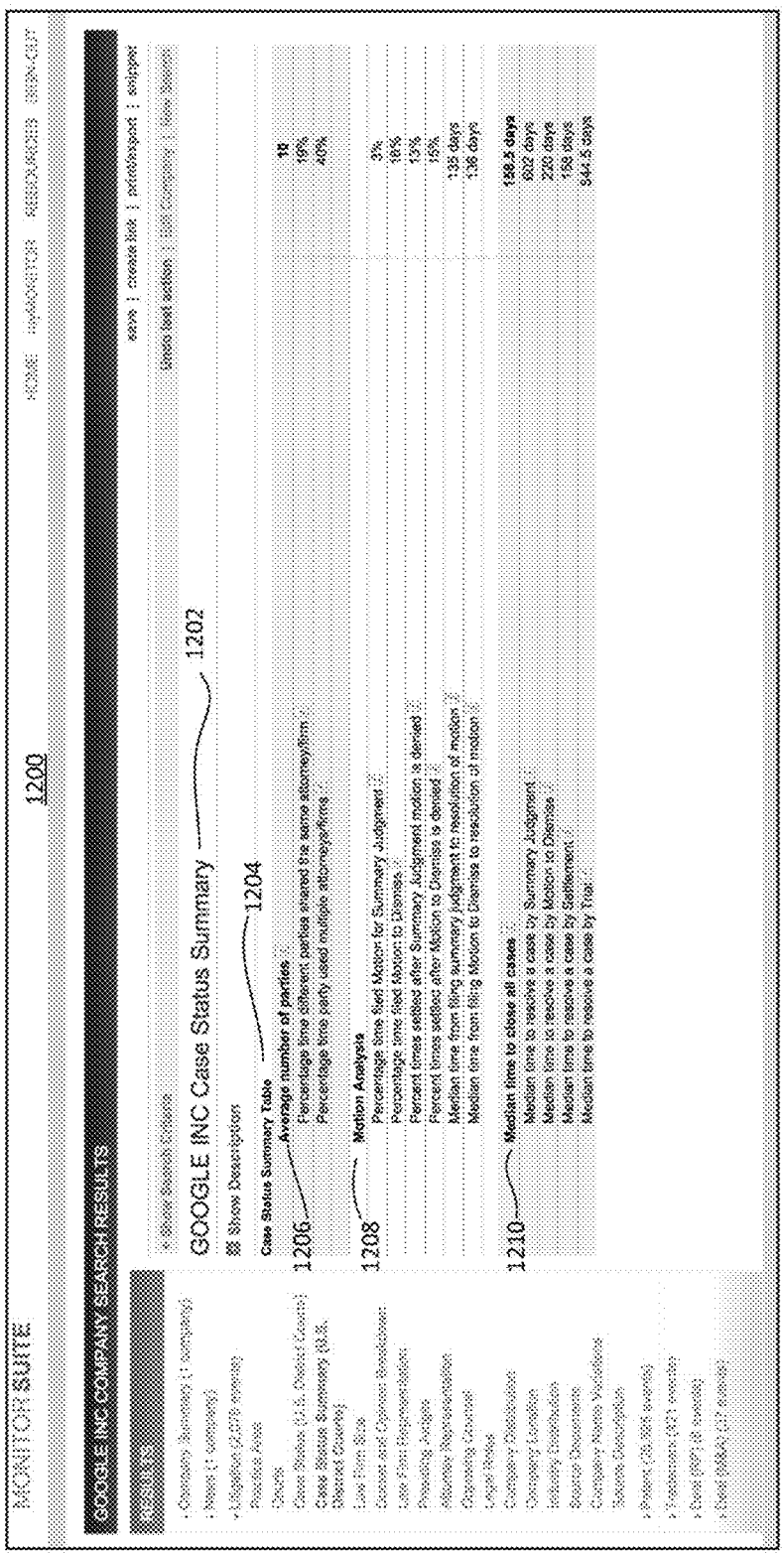
FIG. 7 is a screenshot of an exemplary user interface according to the present invention.

With reference now to FIG. 7, a screenshot of an exemplary user interface 1200 is provided. The user interface 1200 provides a user with the information processed by the ODPE system 100. The user interface 1200 provides a Case Status Summary 1202 for GOOGLE INC. The ODPE system 100 of the present invention may provide a user with information in the form of a case status summary table 1204. The case status summary table 1204 may include information relating to the average number of parties 1206, a "motion analysis" 1208, and median time to close information 1210.

Incorporated by reference herein in the entirety are the following disclosures of technology and systems with which the present invention may be integrated and/or used in conjunction with: U.S. patent application Ser. No. 11/799,768—METHOD AND SYSTEM FOR DISAMBIGUATING INFORMATIONAL OBJECTS issued as U.S. Pat. No. 7,953,724; U.S. patent application Ser. No. 10/171,170—SYSTEMS, METHODS, AND SOFTWARE FOR HYPERLINKING NAMES issued as U.S. Pat. No. 7,333,966; U.S. patent application Ser. No. 11/028,464—SYSTEMS, METHODS, INTERFACES AND SOFTWARE FOR AUTOMATED COLLECTION AND INTEGRATION OF ENTITY DATA INTO ONLINE DATABASES AND PROFESSIONAL DIRECTORIES, issued as U.S. Pat. No. 7,571,174; U.S. patent application Ser. No. 12/341,913—SYSTEMS, METHODS, AND SOFTWARE FOR ENTITY RELATIONSHIP RESOLUTION; U.S. patent application Ser. No. 12/341,926—SYSTEMS, METHODS, AND SOFTWARE FOR ENTITY EXTRACTION AND RESOLUTION COUPLED WITH EVENT AND RELATIONSHIP EXTRACTION; U.S. patent application Ser. No. 12/658,165—METHOD AND SYSTEM FOR RANKING INTELLECTUAL PROPERTY DOCUMENTS USING CLAIM ANALYSIS issued as U.S. Pat. No. 9,110,971; U.S. patent application Ser. No. 14/789,857—METHOD AND SYSTEM FOR RELATIONSHIP MANAGEMENT AND INTELLIGENT AGENT; U.S. patent application Ser. No. 13/594,864—METHODS AND SYSTEMS FOR MANAGING SUPPLY CHAIN PROCESSES AND INTELLIGENCE; U.S. patent application Ser. No. 13/914,393—METHODS AND SYSTEMS FOR BUSINESS DEVELOPMENT AND LICENSING AND COMPETITIVE INTELLIGENCE; and U.S. patent application Ser. No. 14/726,561—METHOD AND SYSTEM FOR PEER DETECTION; all of which are incorporated by reference herein in their entirety.

The present invention is not to be limited in scope by the specific embodiments described herein. It is fully contemplated that other various embodiments of and modifications to the present invention, in addition to those described herein, will become apparent to those of ordinary skill in the art from the foregoing description and accompanying drawings. Thus, such other embodiments and modifications are intended to fall within the scope of the following appended claims. Further, although the present invention has been described herein in the context of particular embodiments and implementations and applications and in particular environments, those of ordinary skill in the art will appreciate that its usefulness is not limited thereto and that the present invention can be beneficially applied in any number of ways and environments for any number of purposes. Accordingly, the claims set forth below should be construed in view of the full breadth and spirit of the present invention as disclosed herein.

The invention claimed is:

1. A computer-implemented system for predicting an expected resolution time of a legal case, the system comprising:
a computing device having a processor in electrical communication with a non-transitory memory, the non-transitory memory adapted to store data and instructions for executing by the processor;
an outcome prediction engine operating on the computing device and comprising:
a sequence tagger adapted to identify by a sequence tagging classifier a set of parties in a set of docket entries based in part on training data comprising a training set of parties derived from n-grams of text in the set of docket entries;
a data access module adapted to access from either the memory or a database having stored therein a first set of docket entry data, the first set of docket entry data including the set of docket entries for at least one open docket having an associated set of parties related to a legal case, wherein the associated set of parties related to the legal case are derived from the set of parties identified by the sequence tagger; and
a regression module when executed by the processor adapted to perform a regression calculation against docket entries associated with each party from the associated set of parties to determine an expected resolution time attribute associated with the open docket; and
an output adapted to transmit a signal related to the determined expected resolution time attribute.

2. The system of claim 1, wherein the determined expected resolution time attribute is determined based on a set of measured or detected features including one or more of: a function of the number of parties involved; the court handling the legal case, the type of issues or claims being adjudicated, the practice areas involved, the text in the docket entries, metadata associated with the docket entries, the judge assigned to the legal case, the law firm or attorneys representing parties in the legal case.

3. The system of claim 1, wherein the determined expected resolution time attribute is based on a full probability density function non-parametrically via histograms and implementing a maximum a posteriori (MAP) estimation.

4. The system of claim 1, wherein the expected resolution time attribute is determined based on a Bayesian Network Model.

5. The system of claim 1, wherein the determined expected resolution time attribute represents an estimated number of days between a filing date and a closing date as a continuous random variable $T \geq 0$ with probability density function $f(\tau)$ and cumulative distribution function $F(\tau)=\Pr\{T<\tau\}$, which gives the probability that the docket closes by day $\tau$, and T is restricted to be supported on nonnegative integers, $T \in \{0\} \cup \mathbb{Z}^+$.

6. The system of claim 1, wherein the first set of docket entry data includes data associated with docket d and $d = \{e_1, \ldots, e_\tau\}$ represents the set of docket entries from the filing date (day 1) until the resolution date (day T), and wherein each entry $e_\tau$ is a sparse vector of word-count frequencies represented by $e_\tau = (\omega_{\tau 1}, \ldots, \omega_{\tau |V|})$ where $\omega_{\tau i}$ is the frequency of term i at entry $e_\tau$ and $|V|$ is the size of the vocabulary.

7. The system of claim 6, wherein for each word in the vocabulary, $|V|$, a vector of numbers is mapped to the word and wherein each vector entry represents a latent semantic futures of the word.

8. The system of claim 5, wherein probability density function $f(\tau)$ is represented as a set of probability mass functions $\{f_t(\tau)\}_t$ over a time-horizon $t = 0\Delta t, 2\Delta t, \ldots, T$ where $f_t(\tau) \equiv f(\tau | d_t)$ and $\Delta t$ represents a time-granularity and $\tau$ follows the same scale as t, wherin $f_t$ represents the belief about the resolution time for a docket given that only docket entries entered up to time t can be observed, and $f_t(\tau)$ is the estimate of the probability that a docket will be resolved between day $\tau + \Delta t$ and day $\tau$ given entries entered up to day t.

9. The system of claim 8, wherein $f(\tau)$ is a sequence function $\{f_t\}_t$ that represents the evolving belief over time as to a predicted outcome as more information about a docket is gathered.

10. The system of claim 5, wherein $f_0$ represents an initial value determined by generating a histogram of the resolution times for dockets prior to text being entered as represented by the expression:

$$f_0(\tau) = \frac{1}{N}\sum_{n=0}^{N} 1_{\{T(n)=\tau\}},$$

where $1_P$ represents an indicator on predicate P, and T(n) represents the resolution time of docket n.

11. The system of claim 10, wherein Bayes' Theorem is used to update probability density function $f(\tau)$ over time as new docket entries are entered for a docket:

$$f_t + \Delta t(\tau) = \frac{g(d_{t+\Delta t} \mid \tau) f_t(\tau)}{g(d_t)}$$
$$= \frac{g(d_{t+\Delta t} \mid \tau) f_t(\tau)}{\sum_{\tau'} g(d_t \mid \tau')}$$

where $g(d_{t+\Delta t}|\tau)$ is the likelihood of observing the set of docket entries $d_{t+\Delta t}$ given that a docket is resolved between day $\tau+\Delta\tau$ and day $\tau$.

12. The system of claim 11, wherein the frequencies of terms across docket entries are independent, and the following multinomial model for the likelihood $g(d_t+\Delta t|\tau)$ is used:

$$g(d_{t+\Delta t} \mid \tau) \equiv g(\{e_1,\ldots,e_{t+\Delta t}\} \mid \tau) \approx \prod_{i=0}^{|V|} p_{ti}^{\sum_{t'=0}^{t} w_{t'i}}$$

where $p_i$ represents the empirical probabilities of observing term i by time t over all dockets in $\mathcal{D}$.

13. The system of claim 1, wherein the first set of docket entry data comprises data from a plurality of dockets $\mathcal{D}$ and $N=|\mathcal{D}|$ is the total number of dockets under consideration.

14. The system of claim 1, wherein the outcome prediction engine is adapted to execute at least two types of predictions including Maximum A Posteriori and Expected Resolution time, wherein Maximum A Posteriori (MAP) prediction yields a prediction at time t as:

$$\hat{T}_t^{MAP} = \underset{\tau}{\arg\max} f_t(\tau)$$

with the mean squared error in the prediction is given by $(\hat{T}_t^{MAP}-T)^2$.

15. The system of claim 14, wherein the Expected Resolution Time (ERT) yields a prediction at time t as:

$$\hat{T}_t^{ERT} = \sum_\tau \tau f_t(\tau)$$

with the mean squared error (MSE) in the prediction is given by $(\hat{T}_t^{ERT}-T)^2$.

16. The system of claim 1, wherein the outcome prediction engine further comprises a survival analysis module adapted to predict the docket resolution time as a function of predictors by implementing a set of functions including a survival function and a hazard function, wherein the survival function is defined at time t, where S(t), is the probability that the docket has not closed by time t expressed as:

$$S(t) = Pr\{T \geq t\}$$
$$= 1 - F(t)$$
$$= \int_t^\infty f(t')dt'.$$

17. The system of claim 16, wherein distribution of T may also be characterized as the hazard function, $\lambda(t)$, which is the rate of change in the probability of a docket closing at time t given that it has remained open up to that point in time, as expressed by:

$$\lambda(t) = \lim_{\Delta t \to 0} \frac{Pr\{t \leq T < t+\Delta t \mid T \geq t\}}{\Delta t}.$$

18. The system of claim 17, wherein the hazard given covariate vector $\chi_i$, is given by:

$$\lambda(t|\chi_i)=\lambda_0(t)\exp(\beta^T\chi_i).$$

19. The system of claim 18, wherein the hazard for two individuals i and j is related by the expression:

$$\lambda(t \mid \chi_i) = \frac{\exp(\beta^T \chi_i)}{\exp(\beta^T \chi_j)} \lambda(t \mid \chi_j)$$
$$= \exp(\beta^T(\chi_i - \chi_j))\lambda(t \mid \chi_j).$$

20. The system of claim 1, further comprising means for deriving N-grams from the first set of docket entry data and applying the derived N-grams to train the regression module; and means for creating training instances from a closed docket by holding out events after a randomly selected point-in-time.

21. The system of claim 16, further comprising wherein the hazard model is a Cox outcome-time model, as expressed by:

$$\lambda(t|\chi_i)=\lambda_0(t)\exp(\beta^T\chi_i)$$

wherein a baseline hazard $\lambda_0(t)$ is common to each individual i represented by a vector of covariates $\chi_i$.

* * * * *